United States Patent [19]

Griffith

[11] 4,346,417
[45] Aug. 24, 1982

[54] SELECTIVELY ACTUABLE MAGNETIC HEAD

[75] Inventor: Neil J. Griffith, San Diego, Calif.

[73] Assignee: Spin Physics, Inc., San Diego, Calif.

[21] Appl. No.: 133,076

[22] Filed: Mar. 24, 1980

[51] Int. Cl.³ .......................... G11B 5/251; G11B 5/28
[52] U.S. Cl. ...................................... 360/115; 360/120
[58] Field of Search ................ 360/119, 115, 120, 121

[56] References Cited

U.S. PATENT DOCUMENTS 3,485,962 12/1969 Barnes ................................. 360/120

Primary Examiner—Robert S. Tupper
Attorney, Agent, or Firm—Robert F. Cody

[57] ABSTRACT

A gapped magnetic core is comprised of core material of one type. Gapping material, which is magnetically different from the core material, "completely" bridges the core gap. The gapping material has a lower magnetic saturation level than does the core material; and thus the gap cannot act as a transducer gap until it becomes magnetically saturated. When gapped cores as described above are stacked to form a multitrack head, the effects of inductive coupling between the cores is prevented; i.e., when, for example, one core of the stack is actuated by magnetically saturating its gap, all other cores of the stack are inherently immune to inductive coupling to the actuated core. This is because induced flux in all non-actuated cores is magnetically short-circuited through their respective magnetic gaps.

4 Claims, 8 Drawing Figures

FIG. 2
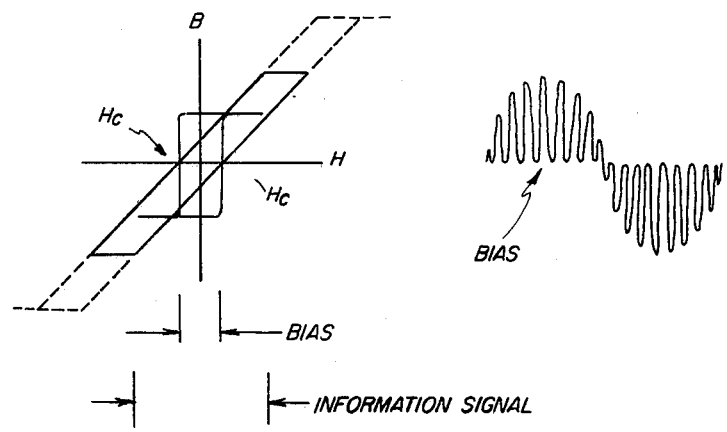
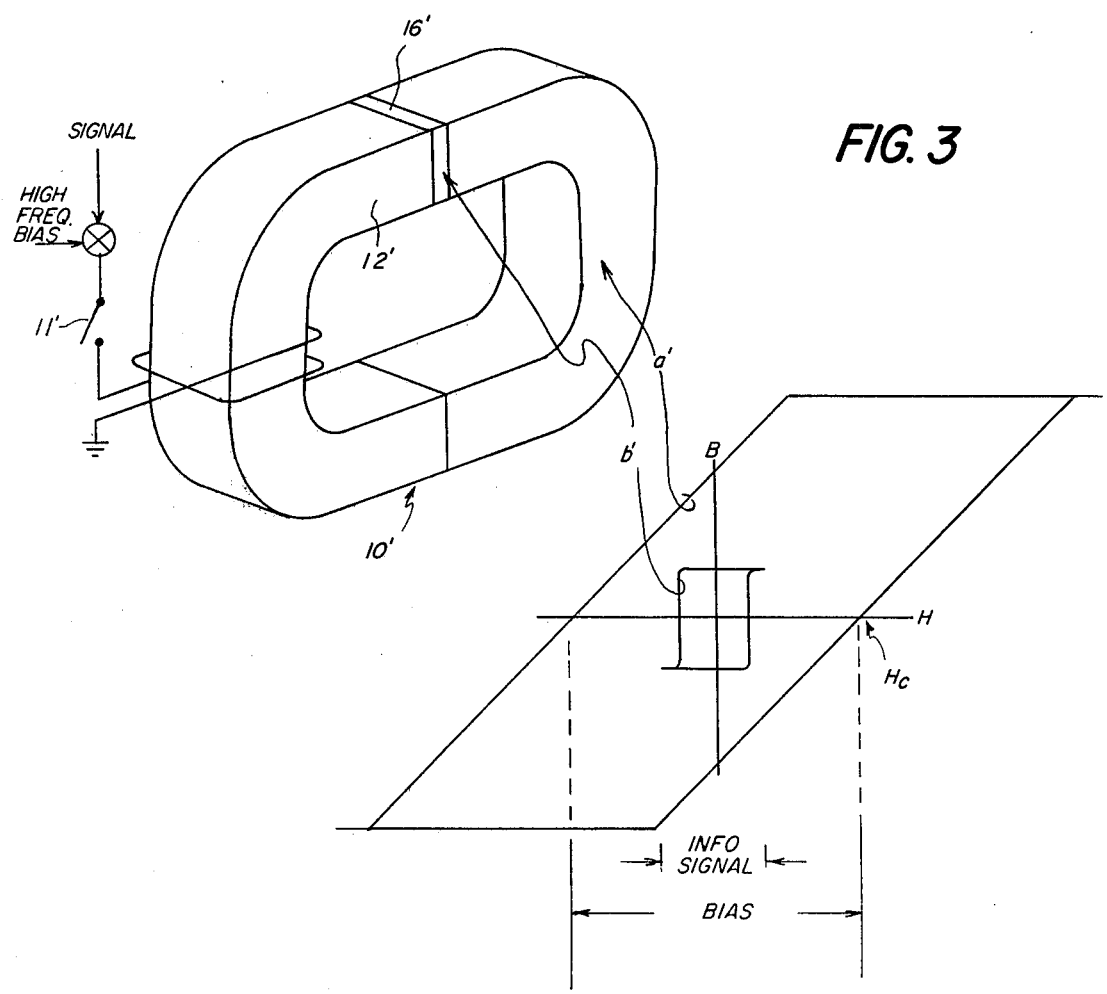
FIG. 3

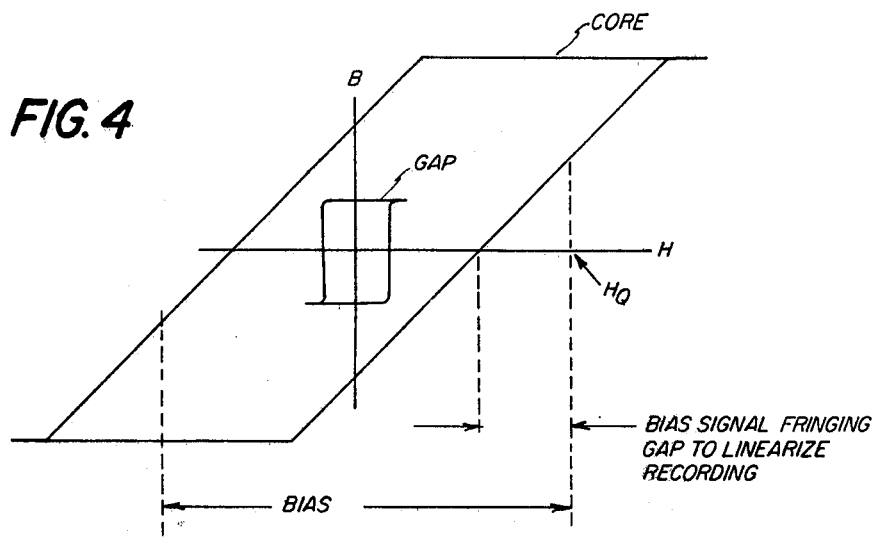
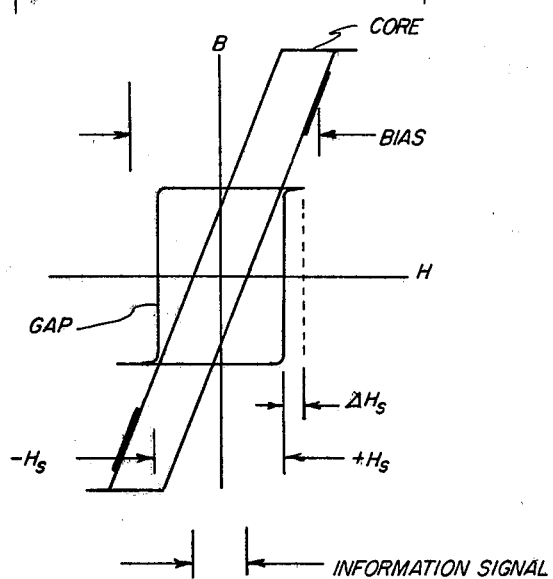
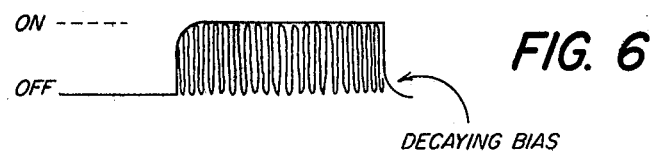

SELECTIVELY ACTUABLE MAGNETIC HEAD

BACKGROUND OF THE INVENTION

1. Field of the Invention

This invention relates in general to magnetic heads and, in particular, to a magnetic head structure which is designed to become operative in response to a magnetic signal which it, itself, carries.

2. Description Relative to the Prior Art

A conventional single-track magnetic head comprises a coil-carrying ring-shaped gapped core of magnetic material having low coercivity, high permeability, and low remanence, the gap being a high reluctance discontinuity formed within the core. During recording, signal flux induced in the core bridges the gap and, in so doing, extends outwardly from the gap, thereby to effect recording in a magnetic medium in contact with the core at its gap. When a plurality of singletrack cores are stacked to form a multitrack record head, each core carrying a respective coil, care must be taken to insulate magnetically the cores from each other. Absent such magnetic insulation, and because core material has a high permeability, it is relatively easy for the magnetic signal in one core to couple inductively into an adjacent core, thereby to cause an unwanted crosstalk signal to be recorded in the track corresponding to the adjacent core. That is, despite the fact that no signal is applied to the coil of the adjacent core, flux induced in the adjacent core can bridge its gap and undesirably record "ghost" information in the medium. Shielding and/or spacing the cores far enough apart to preclude unwanted inductive coupling are common techniques which are employed to avoid this problem, but both techniques suffer from the standpoint of undesirably decreasing head track density.

SUMMARY OF THE INVENTION

To overcome the problem of the prior art, the invention employs to advantage the fact that different magnetic materials have different coercivities and levels of saturation. By making the gap material which forms the gap of a gapped core out of a magnetic material which easily saturates as compared to the core material itself . . . and by making the coercivity of the core material less than the field strength of any magnetic signal to be carried by the core . . . the core will only be operative for recording if (1) the magnetic signal therein saturates the gap material, and (2) the magnetic signal in the core has a field strength which is greater than the coercivity of the core material. In accordance with the invention, gapped cores which are so formed are stacked to provide a multi-track record head and, it will be appreciated, whenever a given core of such a head has been activated by a magnetic signal as discussed above, it along will record such signal, induced signals in adjacent cores being short-circuited through the unsaturated gaps of those adjacent cores.

(It is well appreciated that various prior art techniques, e.g., those of U.S. Pat. Nos. 3,480,935 and 3,686,467, have concerned the use of easily-saturable material which "partially" fills, along with a high-reluctance spacer, the gap of a core so that the core can serve both to record and to play back signals. In apparatus embodying the present invention, which is for an entirely different purpose, the gapping material extends "completely" from one gap-defining core pole to the other, there being absolutely no high-reluctance material of any kind between the core poles.)

The invention will now be described further in relation to the figures, wherein:

FIG. 2 is a diagram useful in describing another embodiment of the invention;

FIG. 3 is a perspective showing of still another embodiment of the invention;

FIGS. 4 and 5 are diagrams useful in describing still other embodiments of the invention;

FIG. 6 is a diagram useful in describing an advantage of apparatus embodying the invention;

Although a presently preferred embodiment of the invention will be discussed below, it is believed that an easy-to-understand appreciation of the invention is best had by a presentation thereof which is by way of a succession of implementations, all of which implementations encompass the invention in one form or another. Recitation of materials for implementing the invention will, also, be reserved to a later discussion of the preferred embodiment.

Figure 1:
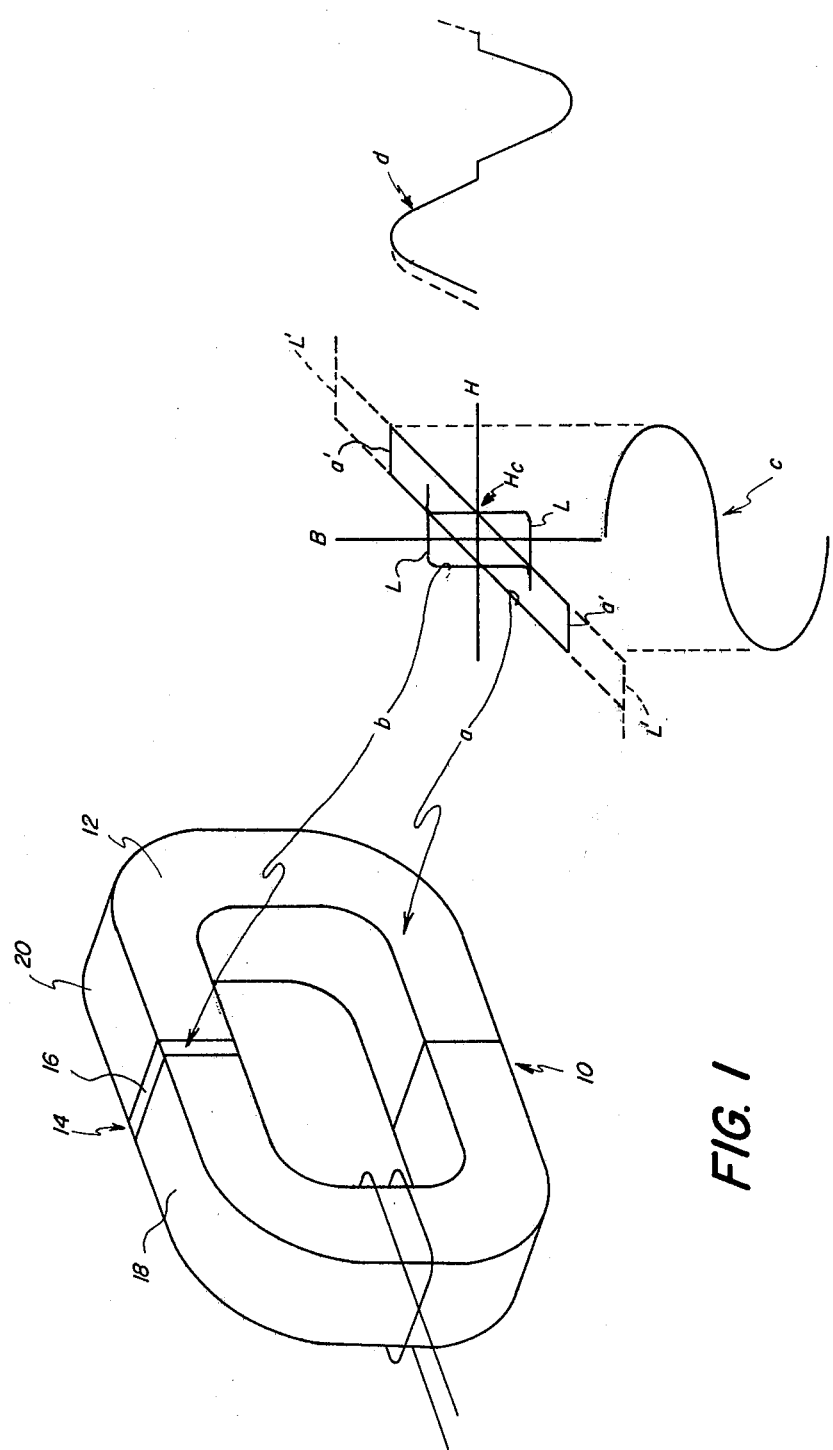
FIG. 1 is a perspective showing of one embodiment of the invention.

With these points in mind, reference should now be had to FIG. 1: Consider a coil-wound record head 10 comprised of magnetic core material 12 having an hysteretic property exemplified by curve a, the core being gapped at 14, and the gap being filled with magnetic gapping material 16 having a hysteretic property exemplified by curve b. To be noted is that both the core and gap materials 12, 16 have, in this embodiment, the same coercivity $H_C$ (which obviously is extremely low in comparison to the coercivities of recording media) and that the gap material will saturate at a lower level L versus L' of the magnetizing force H. This is, according to the invention, an essential relationship that must exist between the materials 12, 16 and, although the gap material 16 is depicted as having a substantially square hysteretic quality, such is not essential, as will become apparent later.

Now, assuming an electrical signal c is applied to the coil of the core 10, the magnetomotive force within the core 10 increases sinusoidally in response to the applied signal and, at a field strength corresponding to the coercivity $H_C$ of the core and gap materials, the gap material suddenly saturates. Prior to such saturation, the gap material 16 constituted a magnetic short circuit between the gap-defining poles (18, 20) and, as a result thereof, no fringe field could possibly exist outside the gap. As is known, however, at saturation $dM/dH$ goes to zero, where M is the magnetic moment per unit volume of the gap material, and attendantly the permeability $\mu$ of the gap material, where $\mu$ equals $1+(dM/dH)$, becomes that of air, viz., equal to one. Thus, it will be appreciated, at the magnetizing field strength $H_C$, the gap 14 will sustain the existence of a fringe field between the poles 18, 20 and, as the sinusoidally increasing magnetomotive force continues, a somewhat distorted flux density (B) version d of the magnetizing signal will be generated at the gap 14 for recording in a magnetic medium, not shown. Needless to say, the signal c can be recovered by electronic means upon playback of the signal d from the medium.

It will be noted from an examination of the hysteretic curves of FIG. 1 that the signal c is intentionally kept sufficiently small that the core material 12 saturating flux density corresponding to the level L' is never attained; and that the flux density signal d is produced by following the minor hysteretic loop best identified by the field reversal paths a'. The poles 18, 20 of the core 10, therefore, do not saturate; and the core is effective to record signals, albeit having been activated by the very signal it records. (Matters pertinent to multitrack adaptations of the invention will be discussed below.)

With the above as background, reference should now be had to FIG. 2 which relates to a technique, within the purview of the invention, that is directed to the cancellation of the aforenoted distortion: By combining the information signal c with a high frequency bias signal . . . such bias signal being (1) of a field strength sufficient to cause the gap material to saturate cyclically at a high rate in opposite directions, and (2) of a field strength that is equal to the coercivity of the core material . . . a linear relationship between the information signal and the gap fringe field can be effected. Note that the bias signal places the quiescent operating point for the information signal at the coercivity $H_C$ of both the gap and core materials; and that the information signal to be recorded alone has, in this embodiment, a field strength greater than the coercivity $H_C$ of the core material. As in all embodiments of the invention, the gap material saturates at a lower level of the magnetizing field (viz., $H_{bias}+H_{information}$) than does the core material, and the core material has a coercivity less than the strength of the combination of magnetic field signals (viz., $H_{bias}+H_{information}$) which are carried by the core . . . the head being turned on by the bias part of the combination of magnetic field signals which it carries. (As an incidental and side advantage of the invention, the technique addressed in connection with FIG. 2 will compensate for the hysteretic characteristics of the core material itself, much in the way that AC bias operates to linearize the recording of information.)

Turning to FIG. 3, a variation of the invention as addressed in connection with FIG. 2 will now be discussed: As indicated, a combination 'bias and information' signal is applied to the coil of a gapped core 10' by means of a switch 11', the core and gap materials 12', 16', respectively, having hysteretic qualities depicted by the hysteretic curves a' and b'. As will be appreciated, the saturating field strength for the gap material 16' is less than that for the core material 12'; and by use of a bias signal corresponding to a field strength of $H_{bias}$, the quiescent operating point for the information signal will reside at a field strength that corresponds to the coercivity $H_C$ of the core material. Again, it will be appreciated that the head of FIG. 3 becomes operative in response to the field signals ($H_{bias}+H_{information}$) which it carries; and such head produces an information-signal representative fringe field whenever such combination of signals exceeds the field strength that corresponds to the coercivity $H_C$ of the core material 12'.

FIG. 4 depicts curves corresponding to another variation of the invention, the bias noted therein being disposed to place the operating point for the information signal at a field strength $H_Q$; and, FIG. 5 indicates that the relative coercivities of the core and gap materials may be reversed so long as the gap material still saturates at a lower field strength ($H_S$) than does the core material . . . the point being that in these, as in all embodiments of the invention, the gap material saturates before the core material, and the field signals processed by the core together have a total field strength greater than the coercivity of the core material. In both FIGS. 4 and 5, it will be appreciated, a fringe field corresponding to an AC bias on which the information signal rides will appear at the gaps in question, such bias being that which is necessary to effect anhysteretic recording in magnetic recording media.

FIG. 6 is presented to show that, upon closure of the switch 11', the alternating bias signal rises to a predetermined level and, upon opening of such switch, the bias decreases to zero, such alternating field decay serving to degauss both the core and gap materials, as is desirable.

Because the coercivity of the core material in a head according to the invention is of consideration vis-a-vis the strength of field signals processed by the core, the nature of the core material may be selected in contemplation of such signals. Notwithstanding this relatively loose requirement for the core material per se, it is, in accordance with the invention, absolutely necessary for the gap material to saturate at a lower field strength than does the core material. Attendantly, from the following Table, taken in part from *Magnetic Recording in Science and Industry*, edited by C. B. Pear, Jr., Reinhold Publishing Company, 1967, page 22, Ferroxcube 3 would be a likely gapping material choice for a core comprised of any of the other listed magnetic materials.

TABLE

| Name | Coercive Force Oersted $\times 10^3/4\pi$ | Saturation Induction Gausses $\times 10^{-4}$ |
|---|---|---|
| High purity iron | 4 | 2.15 |
| Silicon—iron-trans #72 | 40 | 2.00 |
| Si—Fe -- grain oriented | 12 | 2.00 |
| 45 permalloy | 24 | 1.60 |
| 4-79 permalloy | 4 | 0.87 |
| Supermalloy | 0.16 | 0.79 |
| Mumetal | 4 | 0.80 |
| 1040 alloy | 1.2 | 0.60 |
| "Sendust" (cast) | 8 | 0.9 |
| "Alfenol" - 16 | 3.2 | 0.8 |
| Ferroxcube 3 | 8 | 0.25 |
| Ferroxcube 4 | 11.9 to 15.9 | 0.36 to 0.52 |
| Ferroxcube 8Cl | | |
| Kearfott Ferrite MN-30 | 10.2 | .54 |
| Carbonyl Iron Powder | 1200 | 1.5 |
| 2-81 permalloy powder | — | 0.700, |

In accordance with the presently preferred implementation of the invention, however, materials corresponding to the substantially rectangular and parallelogram-like hysteretic curves of FIG. 4 are selected, whereby (1) the core gap will "snap" on and off at a high frequency, (2) the core will not support a signal flux density until the magnetizing field is greater than the coercivities of both the core and gap materials, and (3) a high frequency bias fringe field will exist at the gap to effect anhysteretic recording in a recording medium. To implement the invention in its presently preferred form, a core comprised of 4-79 permalloy, and gapping material comprised of Supermalloy would be most effective.

Figure 7:
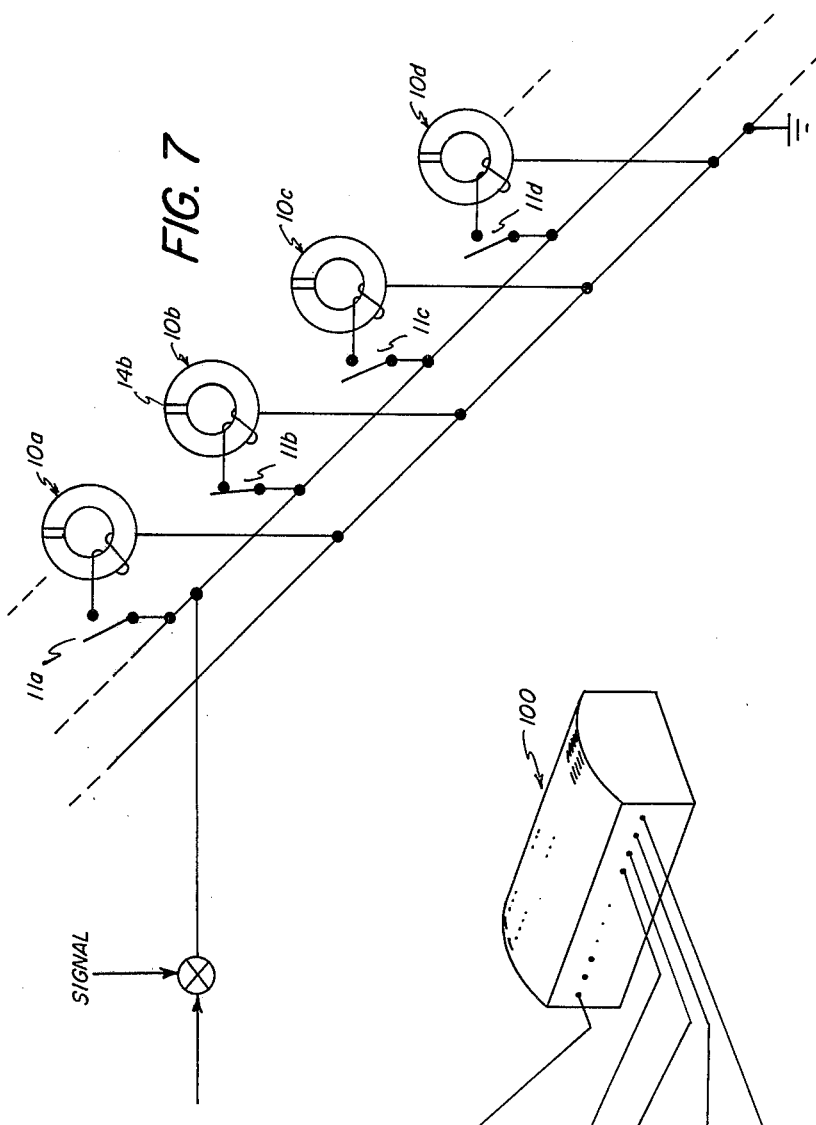
FIG. 7 is a perspective schematic showing of a multi-track head embodying the invention.

With the above as background, consider the close stacking of cores of the indicated type into a multitrack head, parts of which are schematically depicted as in FIG. 7; and assume that a switch 11b associated with a core 10b of the stack is closed, and that the other switches 11a,c,d associated with the stack are all open:

A combination bias-and-information signal is inductively coupled to the core 10b, causing its gap to saturate, and attendantly causing an information signal fringe field to exist at the gap 14b of the core 10b. Since no signals are inductively applied to the cores 10a,c,d, their respective gaps are not magnetically saturated and, as a result thereof, any leakage field from the core 10b is immediately magnetically shorted through the gaps of the cores 10a,c,d, thereby precluding the crosstalk generation of "ghost" information at those gaps.

Figure 8:
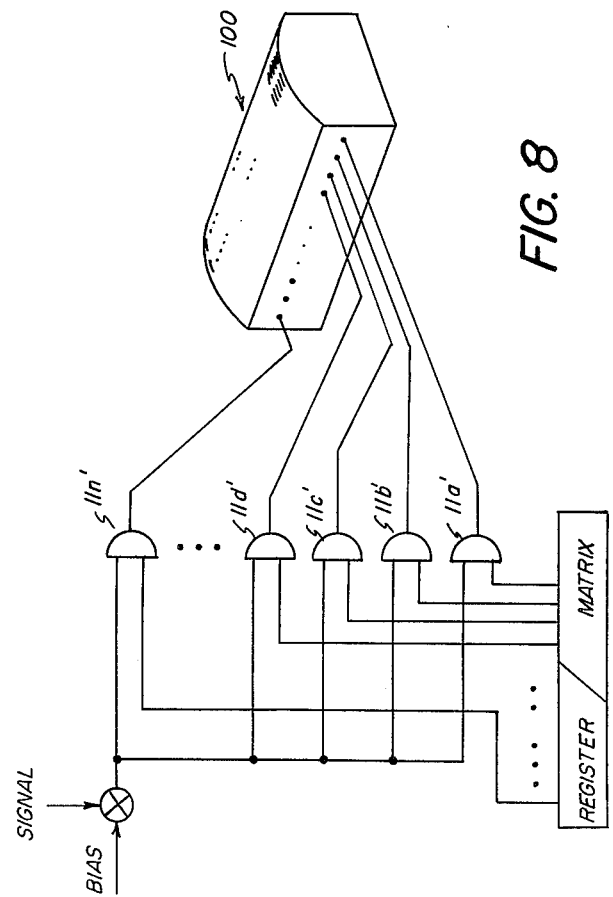
FIG. 8 is a schematic block diagram illustrating a utilization of a multitrack head embodying the invention.

FIG. 8 may be likened to the schematic showing of FIG. 7 and indicates the use of a multitrack head 100 according to the invention in cooperation with a bank of gates 11a', 11b', 11c', etc. The gates, which function like the switches 11a,b,c, etc, are all adapted to receive combination information-and-bias signals and are individually, periodically, turned on in succession by a register and associated matrix, as is well understood by those in the art. Thus, the head 100 of FIG. 8 operates as a "signal scanning" head to record signal information in a succession of closely-spaced tracks, there being no crosstalk between the tracks.

The invention has been described in detail with particular reference to preferred embodiments thereof, but it will be understood that variations and modifications can be effected within the spirit and scope of the invention. For example, it is within the contemplation of the invention to effect saturation of a core gapping material by passing a current through the gap, which current is of sufficient strength to saturate the gapping material, but insufficient to cause saturation of the core material.

What is claimed is:

1. Multichannel record head apparatus, comprising:
   (a) a plurality of discrete gapped magnetic cores, the gaps of which are disposed along a gap line, said cores respectively being of low coercivity and having magnetic saturation levels greater than that which corresponds to a given amount of applied field;
   (b) magnetic gapping material extending completely from one side to the other of said gaps, said gapping material being of low coercivity and being magnetically saturable at said given amount of applied field; and
   (c) means cooperative with said cores for selectively applying fields thereto of at least said given amount, thereby to saturate magnetically said gaps so that said gaps will support respective recording fringe fields, the field of any given gap being incapable of inductively causing the gap of any other core from exhibiting a fringe field when that other core does not have a selectively applied field applied thereto of said given amount.

2. The apparatus of claim 1 wherein the hysteretic curves of said gapped cores and said gapping material are, respectively, substantially in the form of a parallelogram and rectangular, whereby when said means for applying fields to said cores selectively applies a field of said given amount to a given core, that core abruptly becomes actuated for purposes of recording, all other cores of said apparatus which do not selectively receive an applied field of said given amount being prevented from supporting a recording fringe field because their respective gaps are magnetically short-circuited by magnetically unsaturated gapping material.

3. The apparatus of claim 2 wherein said gapped cores have similar coercivities, and wherein the gapping material has a coercivity which is less than the coercivities of said cores.

4. The apparatus of claim 1 wherein said means cooperative with said cores for selectively applying fields thereto is switch means for sequentially actuating said cores by applying, and then removing, a field of said given amount to said respective cores.

* * * * *